April 27, 1937.   F. L. KOHLHAGEN   2,078,857
CLOTHESLINE PULLEY
Filed May 2, 1935
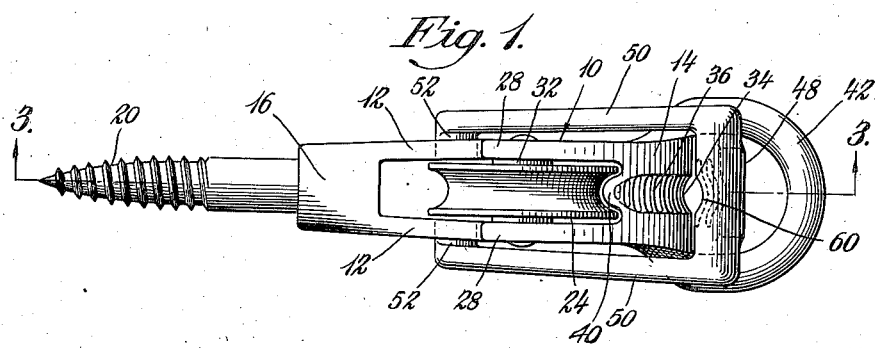
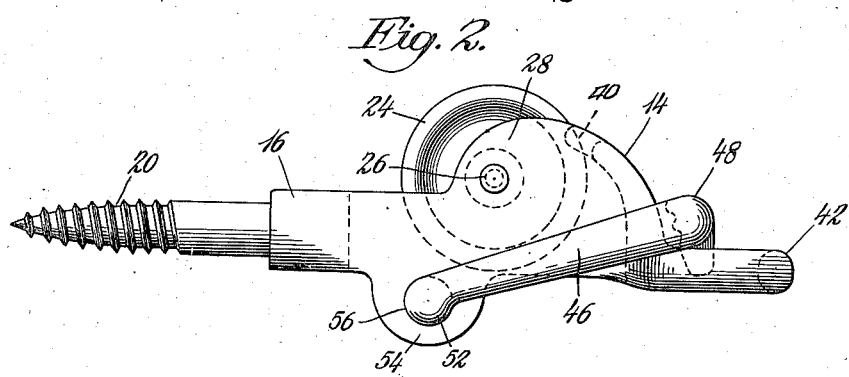
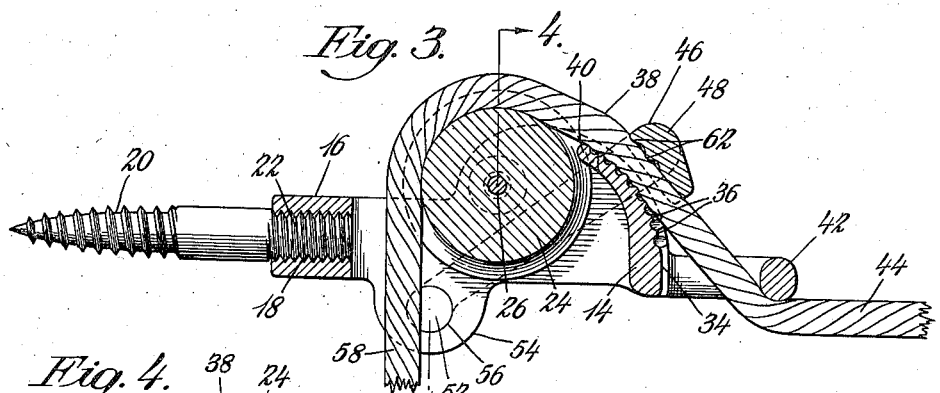
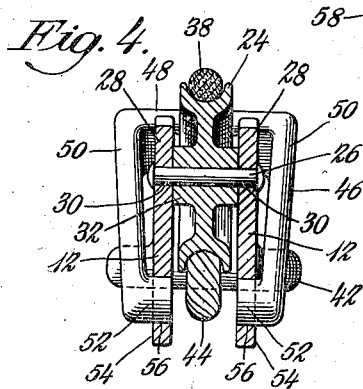
Fred L. Kohlhagen
INVENTOR
BY Victor J. Evans & Co.
HIS ATTORNEYS Patented Apr. 27, 1937

2,078,857

UNITED STATES PATENT OFFICE 2,078,857

CLOTHESLINE PULLEY

Fred L. Kohlhagen, Frankfort, Ill.

Application May 2, 1935, Serial No. 19,512

4 Claims. (Cl. 24—132)

My invention relates to the mounting of clothes lines, and has among its objects and advantages the provision of an improved pulley and latch for the line.

In the accompanying drawing:

Fig. 1 is a top plan view of the device;

Fig. 2 is a side elevation;

Fig. 3 is a sectional view in part along the line 3—3 of Fig. 1; and

Fig. 4 is a sectional view along the line 4—4 of Fig. 3.

In the embodiment selected to illustrate my invention, I make use of a frame 10 including two spaced reaches 12, a connecting wall 14, and a head 16. This head is provided with a threaded opening 18 for the reception of a lag screw 20 having its threaded end 22 anchored in the threaded opening 18. Between the reaches 12 I mount a grooved wheel 24. This wheel is rotatably mounted upon a shaft 26 having its ends connected with flanges 28 formed integrally with the reaches 12. In Fig. 4, I illustrate the shaft 26 as extending through openings 30 in the flanges 28 with its ends riveted. The hub 32 of the wheel 24 is arranged in close relation with the flanges 28 to prevent lateral shifting of the wheel.

The wall 14 is cast integrally with the reaches 12 and the flanges 28. I curve the wall in the direction of the wheel 24 and provide the curved surface with a groove 34 having transverse ribs 36 for engaging the rope 38 passing around the wheel 24. In Fig. 1, the wall 14 is provided with an extension 40 lying within the groove in the wheel 24. I cast a loop 42 integrally with the wall 14, which loop holds the rope 38 against the curved wall 14. The tension end of the rope is represented at 44.

A latch member 46 is movably connected with the frame 10 for latching the rope 38 in position. The latch member is U-shaped in configuration with the bight 48 arranged in operative relation with the wall 14 for clamping the rope thereagainst. Each leg 50 of the latch member 46 is provided with a trunnion 52. The reaches 12 are provided with integral flanges 54 having openings 56 for the reception of the trunnions 52.

The curvature of the wall 14 is such with respect to the pivotal axis of the latch member that the bight 48 is drawn closer to the curved wall as it pivots in the direction of the loop 42. The relation is such that the rope will be firmly clamped against the curved wall when tension is applied to the end 44. However, a slight pull upon the end 58 loosens the rope. The bight may be provided with a shallow groove 60 corresponding to the groove 34. Ribs 62 may be formed in the groove 60 for engaging the rope 38 in the same way as the ribs 36.

In lieu of the lag screw 20, a stud bolt may be anchored in the opening 18 for connection with a suitable supporting structure. My invention embodies relatively few parts, is durable in construction, and performs an efficient latching function for supporting the rope in various adjusted positions.

Without further elaboration, the foregoing will so fully explain my invention that others may, by applying current knowledge, readily adapt the same for use under various conditions of service.

I claim:

1. A clothes line pulley comprising a frame including two spaced parallel reaches, a grooved wheel positioned between the reaches and rotatably carried thereby, a curved pressure member arranged in operative relation with the grooved wheel, a U-shaped latch member having the ends of its legs journaled in said frame, said reaches being positioned between the latch member and the bight of the latter being arranged to swing over said pressure member to pinch a rope thereagainst, an eye carried by said frame for holding the rope in operative relation with the pressure member, and means carried by the frame for securing the latter to a support.

2. A line holding device comprising a frame including two spaced walls, a grooved line supporting wheel positioned between the walls and rotatably carried thereby, a line abutting member carried by said frame, a U-shaped latch member having the ends of its legs journaled in said two spaced walls, the bight of said latch member co-operating with the line abutting member for gripping the line, the axes of the journaled latch member being so positioned as to permit the latch member to swing over the grooved line supporting wheel and said line abutting member, and means carried by said frame for holding the line in operative relation with said line abutting member.

3. A line holding device comprising a supporting body, a grooved line supporting wheel rotatably carried by the supporting body, an arcuate line abutting element carried by the supporting body, and a latch member pivotally connected with the supporting body and cooperating with the line abutting element for gripping the line, said latch member being located eccentrically with respect to the arcuate abutting element.

4. A line holding device comprising a supporting body, a grooved line supporting wheel rotatably carried by the supporting body, a curved line abutting element carried by the supporting body, and a latch member pivotally connected with the supporting body, said latch member being located eccentrically with respect to the abutting element.

FRED L. KOHLHAGEN.